United States Patent
Gaztelumendi Lecuona et al.

(10) Patent No.: US 12,420,492 B2
(45) Date of Patent: Sep. 23, 2025

(54) METHOD FOR PRODUCING A ROTOR BLADE OF A WIND TURBINE

(71) Applicant: Siemens Gamesa Renewable Energy Innovation & Technology S.L., Sarriguren (ES)

(72) Inventors: Jose Javier Gaztelumendi Lecuona, Donostia (ES); Kerem Arslaner, Kampen (NL); Matthijs Bosboom, Oosterwolde (NL); Francisco Javier Hierro-Olabarria Salgado, Alava (ES); Henk Minnema, Komhorn (NL)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 27 days.

(21) Appl. No.: 18/035,306

(22) PCT Filed: Nov. 2, 2021

(86) PCT No.: PCT/EP2021/080323
§ 371 (c)(1),
(2) Date: May 4, 2023

(87) PCT Pub. No.: WO2022/101055
PCT Pub. Date: May 19, 2022

(65) Prior Publication Data
US 2023/0415424 A1 Dec. 28, 2023

(30) Foreign Application Priority Data

Nov. 13, 2020 (EP) .................................. 20382984

(51) Int. Cl.
*B29C 65/34* (2006.01)
*B29C 65/48* (2006.01)
(Continued)

(52) U.S. Cl.
CPC .......... *B29C 65/3432* (2013.01); *B29C 65/48* (2013.01); *B29C 65/70* (2013.01); *B29L 2031/085* (2013.01)

(58) Field of Classification Search
CPC ............................ B29C 65/48; B29C 65/3432
See application file for complete search history.

(56) References Cited

U.S. PATENT DOCUMENTS 4,806,077 A * 2/1989 Bost ...................... B64C 27/473
416/144
9,719,359 B2 8/2017 Dahl et al.
(Continued)

FOREIGN PATENT DOCUMENTS

CN 102661252 B * 1/2014
CN 10397510 A 8/2014
(Continued)

OTHER PUBLICATIONS

Machine translation CN103042700B (Year: 2014).*
(Continued)

*Primary Examiner* — Abbas Rashid
*Assistant Examiner* — Wayne K. Swier
(74) *Attorney, Agent, or Firm* — Schmeiser, Olsen & Watts, LLP

(57) ABSTRACT

A method for producing a rotor blade of a wind turbine includes the following steps: a) providing at least two different components of the rotor blade, b) placing a resistive element between the components, c) placing a thermoplastic or weldable thermoset resin between the components, d) energizing the resistive element so that the resistive element applies heat to the thermoplastic or weldable thermoset resin to melt or to soften it, and e) joining the components together by means of the molten or softened thermoplastic or weldable thermoset resin.

6 Claims, 8 Drawing Sheets

(51) Int. Cl.
   *B29C 65/70*      (2006.01)
   *B29L 31/08*      (2006.01)

(56)          References Cited

U.S. PATENT DOCUMENTS

2014/0030093 A1   1/2014  Dahl et al.
2014/0356053 A1  12/2014  Urayama
2016/0348644 A1* 12/2016  Hayden ................. B29C 65/483
2019/0160759 A1   5/2019  Vazquez Castro et al.
2020/0047427 A1   2/2020  Bozsak et al.

FOREIGN PATENT DOCUMENTS

CN          103042700 B  * 10/2014
CN          105673358 B  *  1/2019
CN          109940898 A     6/2019
CN          110603136 A    12/2019
GB            2463250 A     3/2010
WO         2010025830 A2    3/2010
WO      WO-2015014692 A1 *  2/2015   ........... F03D 1/0675
WO      WO-2017220596 A1 * 12/2017   ........... B29C 65/483

OTHER PUBLICATIONS

Machine translation CN102661252B (Year: 2014).*
Machine translation CN105673358B (Year: 2019).*
PCT International Search Report and Written Opinion of International Searching Authority mailed Apr. 14, 2022 corresponding to PCT International Application No. PCT/EP2021/080323 filed Nov. 2, 2021.

* cited by examiner

METHOD FOR PRODUCING A ROTOR BLADE OF A WIND TURBINE

CROSS-REFERENCE TO RELATED APPLICATIONS

This application claims priority to PCT Application No. PCT/EP2021/080323, having a filing date of Nov. 2, 2021, which claims priority to EP Application No. 20382984.1, having a filing date of Nov. 13, 2020, the entire contents both of which are hereby incorporated by reference.

FIELD OF TECHNOLOGY

The following relates to a method for producing a rotor blade of a wind turbine.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experience high wind forces. Rotor blades of this kinds can have lengths exceeding 60 m.

Rotor blades are hollow composite structures intended to be as lightweight and stiff as possible to maximize the mechanical energy transfer from wind to a generator of the wind turbine. To manufacture the hollow structure, the universally most used materials are composite materials where a reinforcement fiber is embedded into a polymeric matrix. The polymers used to date are commonly thermoset plastics, which by molecular nature cannot be post-formed or re-melted once cured to the final shape and are not recyclable.

SUMMARY

An aspect relates to provide an improved method for producing a rotor blade of a wind turbine.

Accordingly, a method for producing a rotor blade of a wind turbine is provided. The method comprises the following steps: a) providing at least two different components of the rotor blade, b) placing a resistive element between the components, c) placing a thermoplastic or weldable thermoset resin between the components, d) energizing the resistive element so that the resistive element applies heat to the thermoplastic or weldable thermoset resin to melt or to soften it, and e) joining the components together by means of the molten or softened thermoplastic or weldable thermoset resin.

Due to the use of the resistive element and the thermoplastic or weldable thermoset resin, it is possible to join the components together very fast and without the need of curing an epoxy resin. The rotor blade can be divided into the components or sub-modules and assembled on the construction site. This improves the transportability of the rotor blade because the components can be transported easier than the entire rotor blade.

The method can also be used to join together pre-assembled sub-modules of the rotor blade. For example, the rotor blade can be divided along its longitudinal direction into components or sub-modules that can be joined by means of the method on the construction site. "Sub-module" or "component" in this context means that the rotor blade comprises a plurality of sub-modules or components that form together the rotor blade. The terms "component" and "sub-module" can be substituted with each other. Providing the component includes manufacturing the component.

"Resistive element" in this context means an element that is electrically conductive and can produce heat by means of a current that is applied to the resistive element. The resistive element can be part of a heating apparatus. The heating apparatus includes the resistive elements, a voltage source or energy source and wires for connecting the voltage source to the resistive element. "Placing" the resistive element between the components means that the resistive element is arranged as an external part between the components that have to be joined together. Alternatively, the resistive element can be part of one of the components.

A thermoplastic resin or thermosoftening resin, is a plastic polymer material that becomes pliable or moldable at a certain elevated temperature and solidifies upon cooling. A thermosetting polymer, resin, or plastic, often called a thermoset, is a polymer that is irreversibly hardened by curing from a soft solid or viscous liquid prepolymer or resin. In contrast to this, a weldable thermoset resin is a material that can at least be softened by applying heat so that the weldable thermoset resin can be used to weld together the components. Thermoplastic or weldable thermoset resin can be placed between the components as an external part. Alternatively, the thermoplastic or weldable thermoset resin can be part of one or more components.

According to an embodiment, the resistive element is embedded in at least one of the components.

This means that the resistive element is part of at least one of the components. Alternatively, all the components can have a resistive element of that kind. "Embedded" in this context can mean that the resistive element is placed below or on a surface of the component.

According to a further embodiment, the resistive element has the form of wires or a mesh.

The resistive element can be made of a metal. For example, the resistive element is made of copper. Alternatively, the resistive element can be made of carbon fibers.

According to a further embodiment, in step c) the thermoplastic or weldable thermoset resin is placed between the components in form of a resin strip.

The resin strip is a continuous strip of thermoplastic or weldable thermoset resin. The resin strip can be made of pure resin. Alternatively, the resin strip can be fiber-reinforced but resin-rich.

According to a further embodiment, the resin strip is wedge-shaped.

This allows to fill a gap between the components that have to be joined. In particular, the resin strip is used to close a gap at a trailing edge of the rotor blade.

According to a further embodiment, in step c) the thermoplastic or weldable thermoset resin is placed between the components by creating resin-rich surface layers on at least one of the components.

This means that the thermoplastic or weldable thermoset resin is part of at least one of the components. All components can have resin-rich surface layers of that kind. "Resin-rich" in this context means that the fiber percentage is lower than 90%, lower than 80%, lower than 70%, lower than 60%, lower than 50%, lower than 40%, lower than 30%, lower than 20%, lower than 10%.

According to a further embodiment, after step e) the resistive element remains in the rotor blade.

This means that the resistive element is an integral part of the rotor blade. The resistive element is thus not removed from the rotor blade after joining the components.

According to a further embodiment, the resistive element comprises resin-coated wires that are placed between the components.

The wires comprise an electrically conducting core and a coating made of thermoplastic or weldable thermoset resin. The core can be made of metal or carbon fibers. When the core is energized, the coating melts or softens to join the components to each other.

According to a further embodiment, during steps d) and e) external pressure is applied to the components.

The external pressure presses the components together, so that the molten or softened thermoplastic or weldable thermoset resin connects the components together.

According to a further embodiment, the external pressure is applied by means of a mold.

In particular, the external pressure is applied by means of a clamping system integrated into the mold.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
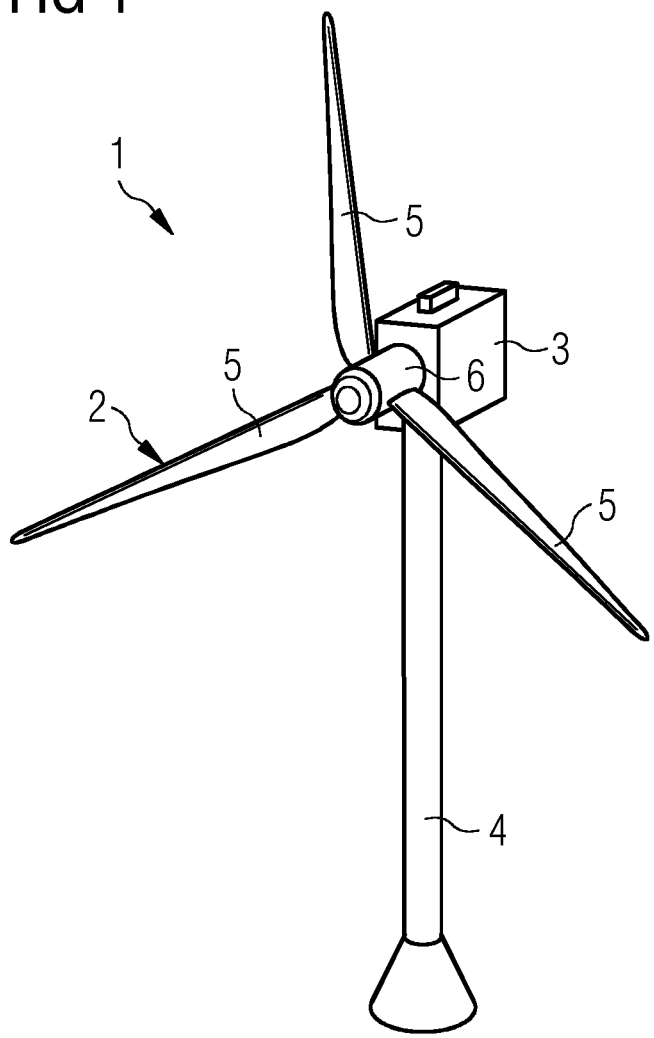
FIG. 1 shows a perspective view of a wind turbine according to one embodiment.

In the Figures, like reference numerals designate like or functionally equivalent elements, unless otherwise indicated.

FIG. 1 shows a wind turbine 1 according to one embodiment.

"Wind turbine" presently refers to an apparatus converting the wind's kinetic energy into rotational energy, which may again be converted to electrical energy by the apparatus.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Oftentimes, glass fibers in the form of unidirectional fiber mats are used.

Figure 2:
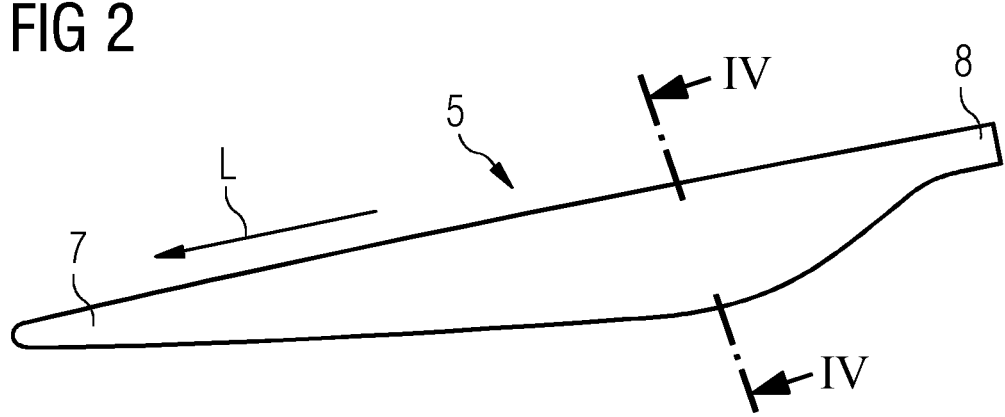
FIG. 2 shows a perspective view of a rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6. The rotor blade 5 comprises a longitudinal direction L. The longitudinal direction L is directed from the blade root 8 in direction of the aerodynamically designed portion 7. However, the longitudinal direction L can be oriented vice versa.

These rotor blades 5 are hollow composite structures intended to be as lightweight and stiff as possible to maximize the mechanical energy transfer from wind to the generator. To manufacture the hollow structure, the universally most used materials are composite materials where a reinforcement fiber is embedded into a polymeric matrix. The polymers used to date are commonly thermoset plastics, which by molecular nature cannot be post-formed, joined or re-melted once cured to the final shape, and are not recyclable. These materials are also not easily drilled and have a poor bearing load capability for conventional fastening elements, which is a mechanical fastening method that is also impractical due to the sheer size of the current rotor blades, which are in excess of 60 meters long, and the low weight requirements. The size of the rotor blades is thus in conflict with the low weight requirements.

Figure 3:
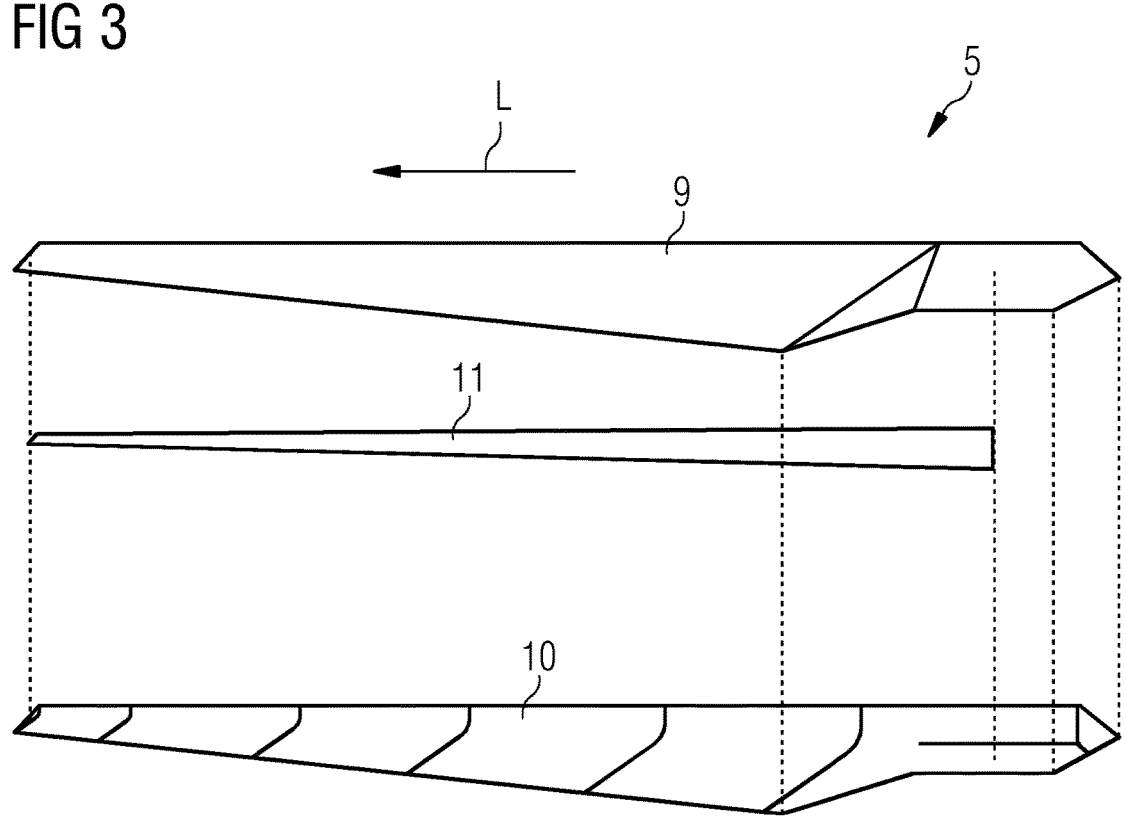
FIG. 3 shows an exploded view of the rotor blade according to FIG. 2.

FIG. 3 shows an exploded view of the rotor blade 5.

The options for joining, bonding or welding the hollow structures of the rotor blade 5 are so far limited to either create the entire structure in a one-shot molding process which is technically complex and requires specialized tooling or join sub-parts—most commonly blade half-shells 9, 10—by means of an adhesive bonding process performed using also a thermoset material.

A first half-shell 9 of the rotor blade 5 is manufactured and cured in parallel to a second half-shell 10. Then both half-shells 9, 10 and additional structural element 11 or several structural elements 11, such as shear webs or spar caps, are joined together using said adhesive. This adhesive and the resulting bonding line are a material that is also non-recyclable and adds weight and presents a potential failure point to the structure of the rotor blade 5. More general, the half-shells 9, 10 and the structural element 11 can be named "components" of the rotor blade 5.

The joining process involves the application of the adhesive paste, which is a multi-component system that requires mixing and metering equipment and pressurized pumps for distribution, the physical joining of the bonding surfaces by means of a mold closure operation that involves the rotor blade 5, curing the adhesive at elevated temperatures and cooling down to allow for demolding and further processing of the rotor blade 5. Then, a split line of the rotor blade 5 over the joining zone has to be reinforced, both internally and externally, with further fiberglass fabric reinforcements and resin to limit structural weakness caused by the adhesive line.

As the components of the rotor blade 5 are manufactured by either wet lay-up or vacuum assisted infusion in large scale molds, the resulting dimensional tolerances do not allow for a tight positioning of all components resulting in a gap at the split lines that needs to be filled with adhesive, further reducing mechanical performance of the joint and adding weight. Hence, it is desirable to improve this process.

Figure 4:
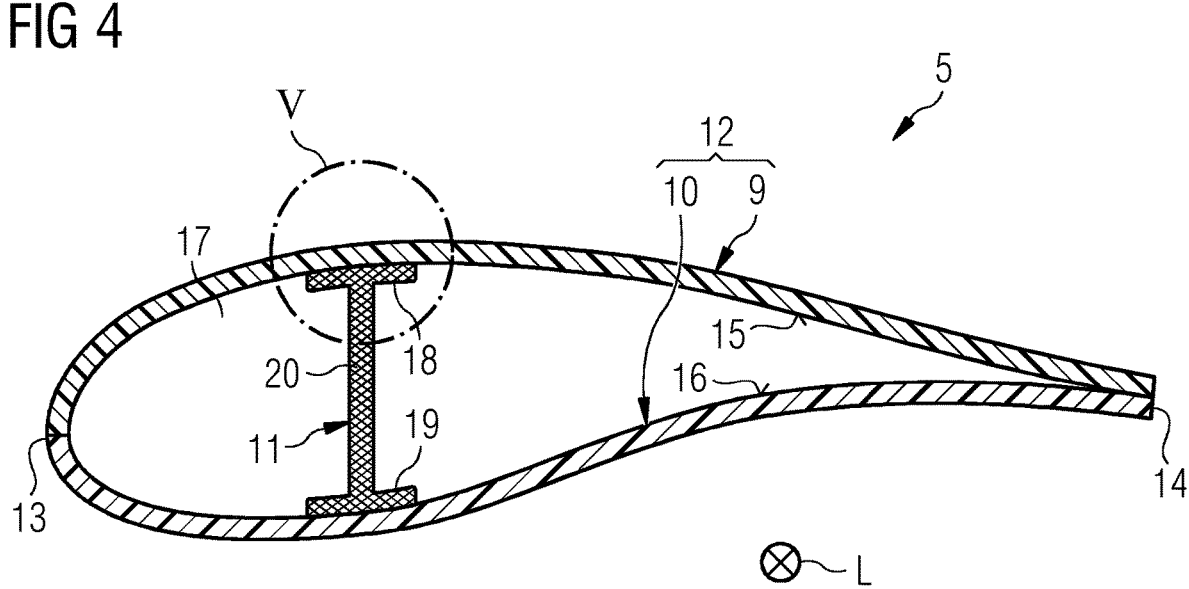
FIG. 4 shows a cross-sectional view of the wind turbine rotor blade along the intersection line IV-IV of FIG. 2.

FIG. 4 shows a cross-sectional view of an improved rotor blade 5 according to the intersection line IV-IV in FIG. 2.

The rotor blade 5 has an outer blade shell 12 comprising the first half-shell 9 and the second half-shell 10, which are connected to each other at a leading edge 13 of the rotor blade 5. The half-shells 9, 10 are also connected to each other at a trailing edge 14 of the rotor blade 5. The outer blade shell 12 may comprise composite fiber material, in particular glass fiber mats. The fiber material is impregnated with a polymer material, in particular with thermoplastic or weldable thermoset resin. The first half-shell 9 constitutes a suction side of the rotor blade 5. The second half-shell 10 constitutes a pressure side of the rotor blade 5.

The first half-shell 9 comprises an inner surface 15 and the second half-shell 10 comprises an inner surface 16 being arranged opposite to each other and facing each other. An inner space 17 of the rotor blade 5 is defined by means of the inner surfaces 15, 16. The structural element 11 is located inside the inner space 17 extending from the inner surface 15 of the first half-shell 9 to the inner surface 16 of the second half-shell 10.

The structural element 11 runs in the longitudinal direction L. The structural element 11 comprises fiber composite material, in particular glass fiber mats. The structural element 11 can be a shear web, a spar cap or the like. In particular, the structural element 11 is a shear web comprising two flanges 18, 19 that are attached to the inner surfaces 15, 16 and a web 20 that connects the flanges 18, 19 to each other.

Figure 5:
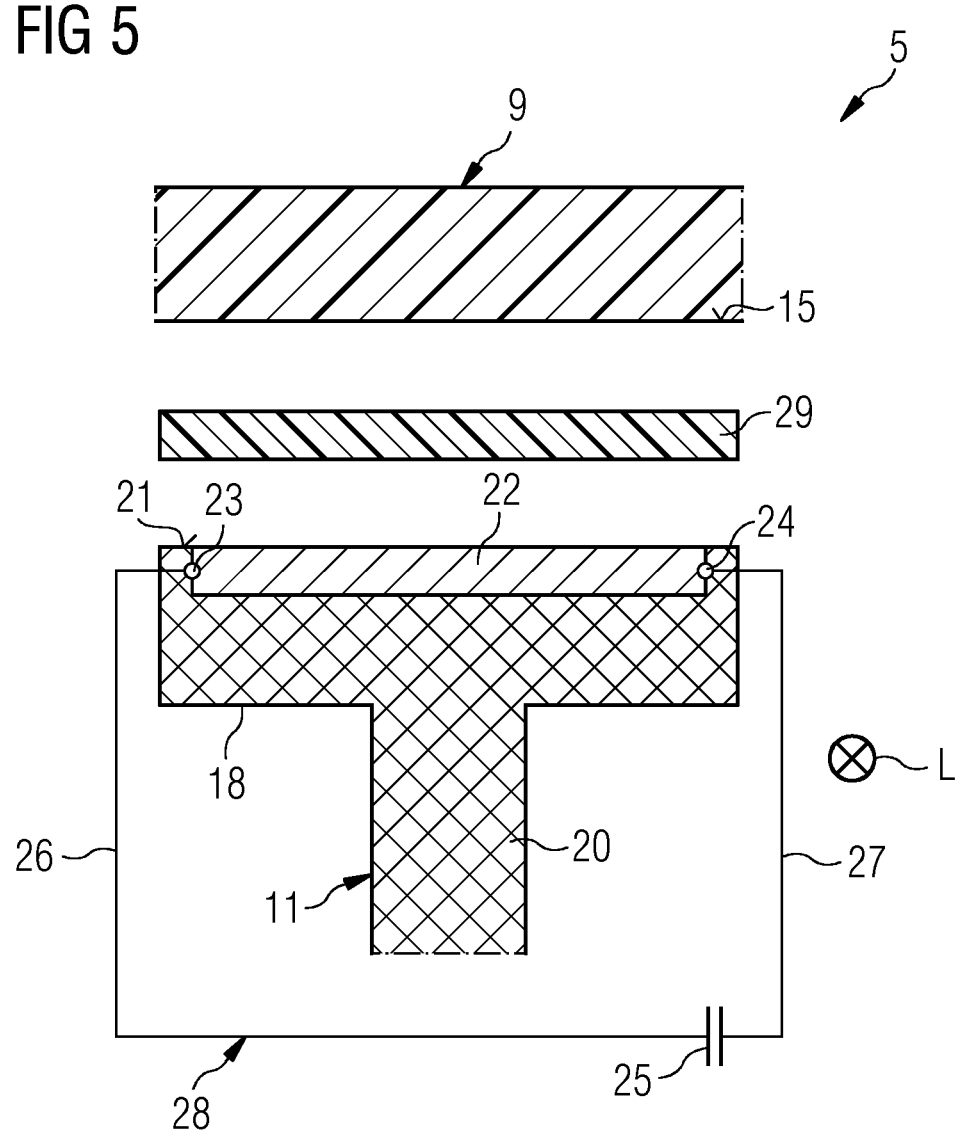
FIG. 5 shows the detail view V according to FIG. 4.

FIG. 5 shows an exploded detail view of the rotor blade 5 according to the detail view V in FIG. 4.

The flange 18 of the structural element 11 has a surface 21 that faces the inner surface 15 of the first half-shell 9 of the rotor blade 5. The rotor blade 5 comprises a resistive element 22. The resistive element 22 can be part of the structural element 11 or part of the first half-shell 9. The resistive element 22 can be embedded in the surface 21 or in the inner surface 15. As can be seen in FIG. 5, the resistive element 22 is embedded in the surface 21 of the structural element 11. However, FIG. 5 shows only an exemplary embodiment of the rotor blade 5.

The resistive element 22 comprises an electrically conducting material, like for example a metal or carbon fibers. Copper can be used as material. For example, the resistive element 22 comprises resin-coated wires or a resin-coated mesh. The resistive element 22 has connectors 23, 24. A voltage source 25 is connected to the connectors 23, 24 via wires 26, 27. The resistive element 22, the connectors 23, 24, the voltage source 25 and the wires 26, 27 form a heating apparatus 28 of the rotor blade 5. The wires 26, 27 are optional. The resistive element 22 can also be powered by means of induction.

The rotor blade 5 can comprise several heating apparatuses 28. For example, each flange 18, 19 of the structural elements 11 as well as the trailing edge 14 have a heating apparatus 28 of that kind. Also, the leading edge 13 can have a heating apparatus 28.

Further, a solid resin strip 29 is provided. The resin strip 29 can be a fiber material that is rich of resin. The resin strip 29 can be pure resin too. The resin is a thermoplastic or weldable-thermoset resin. The resistive element 22 can embedded in the resin strip 29 or can be a separate material placed between the half-shells 9, 10. The components of the rotor blade 5 can be heated by means of an electric voltage passed through the resistive element 22, which by the Joule Effect generates the heat. The resin strip 29 has the normal gap thickness that is around 6±2 mm.

Figure 6:
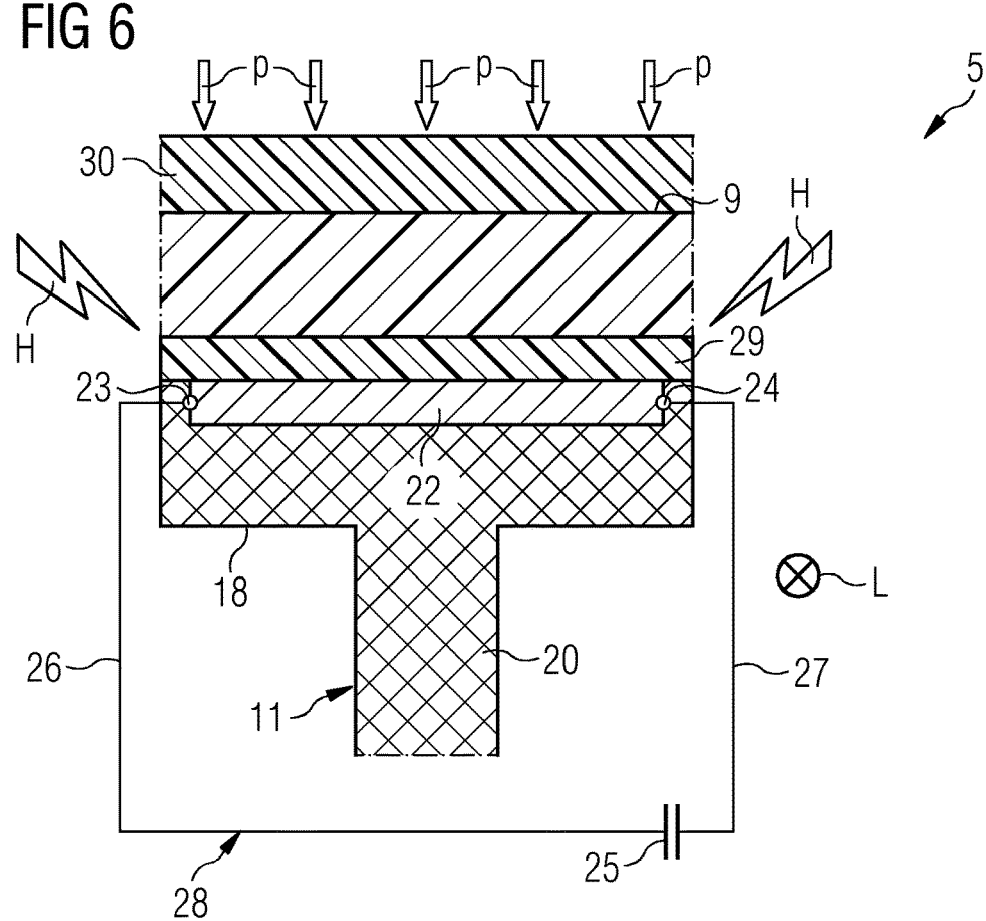
FIG. 6 shows again the detail view V according to FIG. 4.

FIG. 6 again shows the detail view V according to FIG. 4.

To connect the structural element 11 and the first half-shell 9 to each other, mechanical pressure p is applied to the structural element 11 and the first half-shell 9 by means of a mold 30 or a vacuum bag. The pressure p is applied by means of a mold clamping system of the mold 30 as it is done in known adhesive bonding.

Then the heating apparatus 28 is powered by applying a current to the resistive element 22. In this way, the resistive element 22 applies heat H to the resin strip 29. The resin of the resin strip 29 is then softened, chemically activated or fused enough to form a continuous joint and then is cooled down, solidifying again as a homogeneous laminate. During heating the resin strip 29, the pressure p is still applied.

Figure 7:
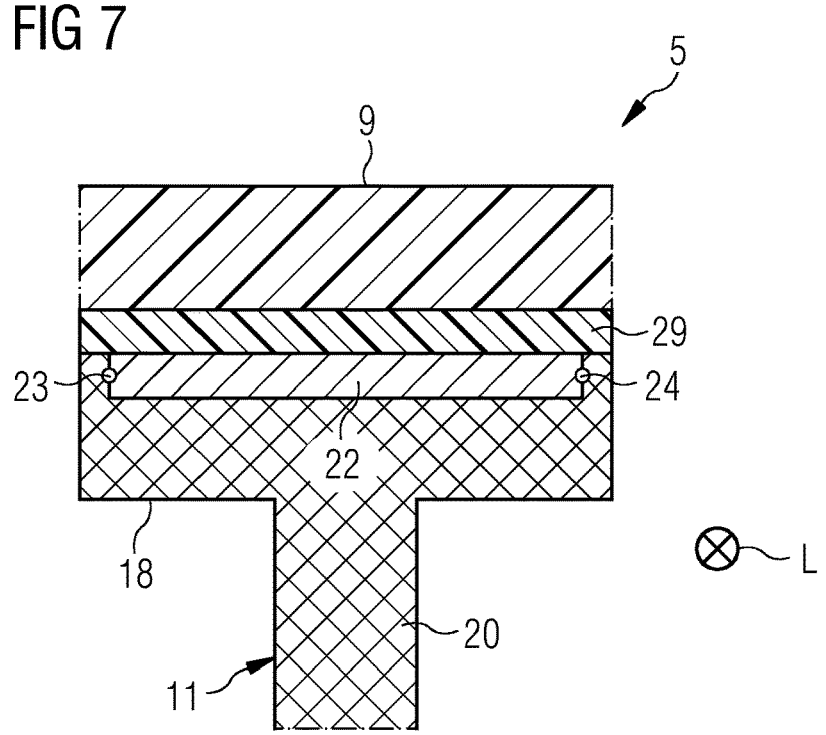
FIG. 7 shows again the detail view V according to FIG. 4.

FIG. 7 again shows the detail view V according to FIG. 4.

After cooling down, the rotor blade 5 is demolded. The welding process is complete. The resulting joint between the structural element 11 and the first half-shell 9 is a homogeneous and continuous laminate. The wires 26, 27 are removed from the connectors 23, 24 and the rotor blade 5 can be further processed.

Figure 8:
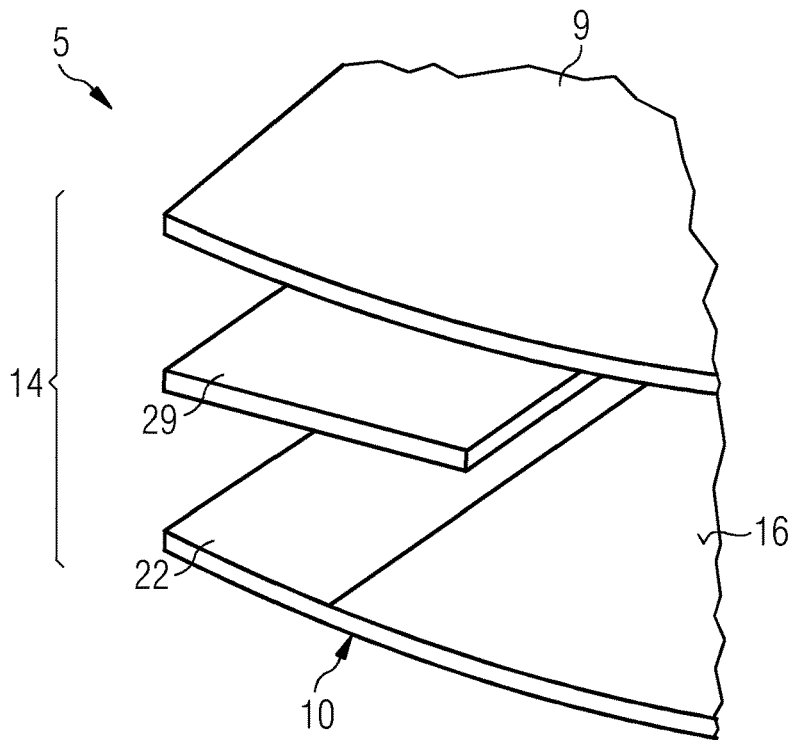
FIG. 8 shows an exploded perspective detail view of the rotor blade according to FIG. 2.

FIG. 8 shows an exploded perspective detail view of the rotor blade 5.

In particular, FIG. 8 shows the trailing edge 14 of the rotor blade 5. A resin strip 29 as mentioned before is placed between the first half-shell 9 and the second half-shell 10. A resistive element 22, which is part of a heating apparatus 28 (not shown) as mentioned before, is embedded in the second-half shell 10, in particular in the inner surface 16 of the second half-shell 10. The resistive element 22 is infused in the inner surface 16. Alternatively, the resistive element 22 can be provided at or in the first half-shell 9. Both half-shells 9, 10 can have a resistive element 22.

The resin strip 29 has the required shape to fill a design gap in the trailing edge 14. The resin strip 29 can be wedge-shaped. This allows a better adaption to the design gap of the trailing edge 14 as required. The resistive element 22 can be a mesh or carbon layer.

Figure 9:
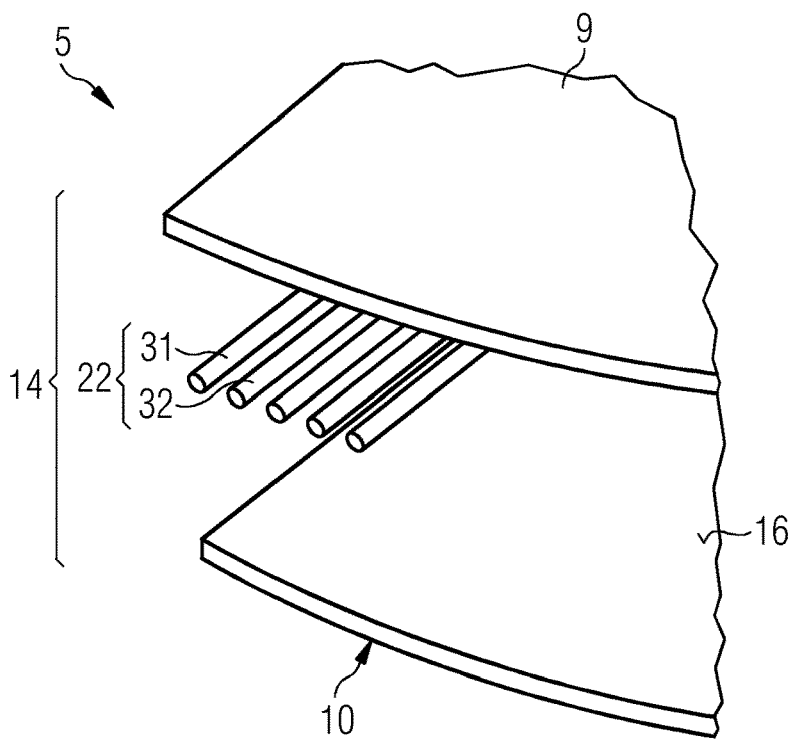
FIG. 9 shows a further exploded perspective detail view of the rotor blade according to FIG. 2.

FIG. 9 shows a further exploded perspective detail view of the rotor blade 5.

In this case, the resistive element 22 comprises resin-coated wires 31, 32. The resistive element 22 is placed between the half-shells 9, 10. The resistive element 22 also provides the resin for joining the half-shells 9, 10.

Figure 10:
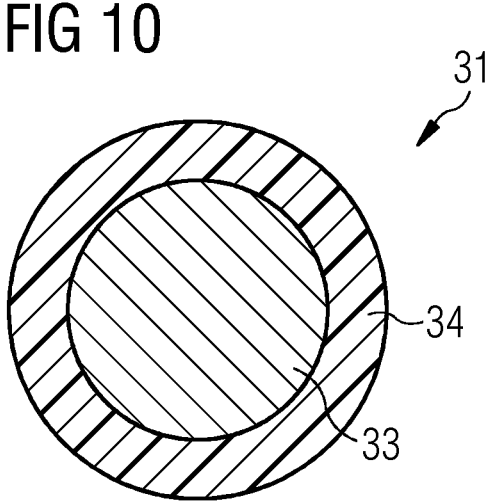
FIG. 10 shows a cross-sectional view of a resin-coated wire according to one embodiment.

FIG. 10 shows a cross-sectional view of the wire 31.

The wire 31 comprises a core 33 which is electrically conductive. The core 33 can be a metal wire or a carbon filament. The core 33 can be made of copper. The core 33 is coated with a thermoplastic or weldable thermoset resin 34. The core 33 acts as a resistive element.

Figure 11:
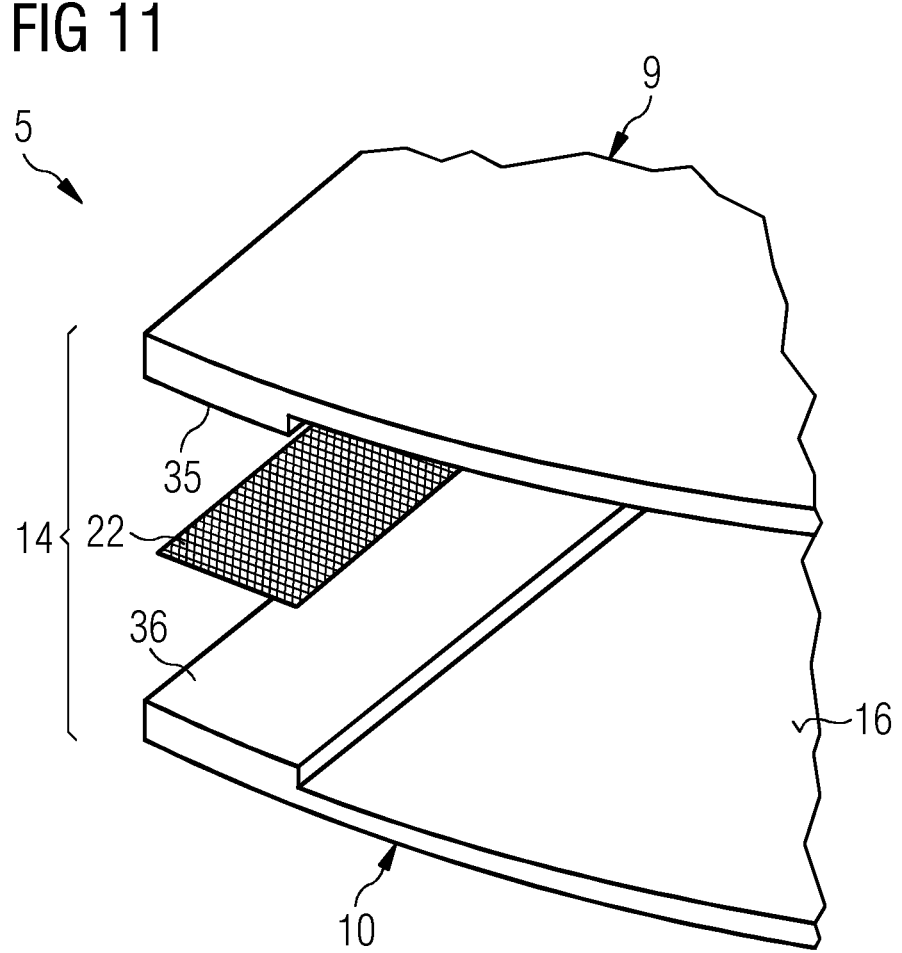
FIG. 11 shows a further exploded perspective detail view of the rotor blade according to FIG. 2.

FIG. 11 shows a further exploded perspective detail view of the rotor blade 5.

In this case, the resistive element 22 is in the form of a carbon or metal mesh. The resistive element 22 is placed between the half-shells 9, 10. The thermoplastic resin is infused in the laminates of the half-shells 9, 10 creating surface resin-rich layers 35, 36. The layers 35, 36 can be molten or softened by energizing the resistive element 22 to join the half-shells 9, 10 to each other.

Figure 12:
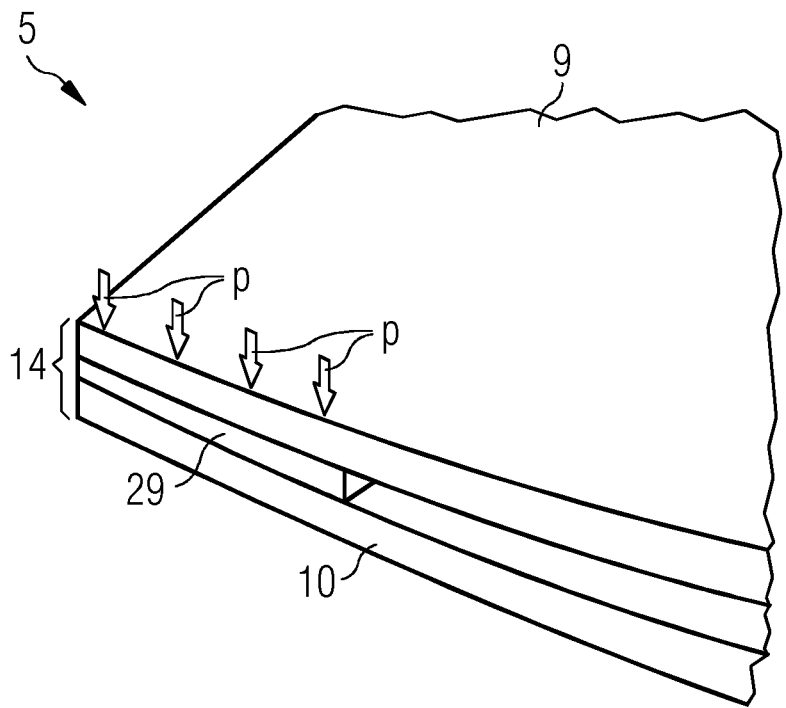
FIG. 12 shows a perspective detail view of the rotor blade according to FIG. 2.

FIG. 12 shows a perspective detail view of the rotor blade 5.

After placing the resistive element 22 (not shown) and the resin strip 29 between the half-shells 9, 10, pressure p is applied to the trailing edge 14 by means of the mold 30 (not shown). Both edges of the half-shells 9, 10 are in contact with the resin strip 29.

Figure 13:
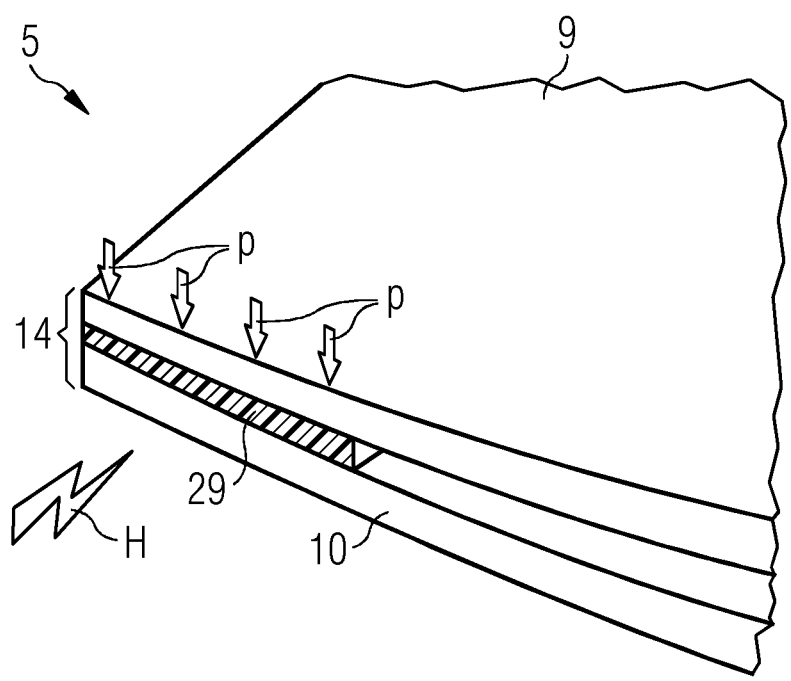
FIG. 13 shows a further perspective detail view of the rotor blade according to FIG. 2.

FIG. 13 shows a further perspective detail view of the rotor blade 5.

While applying pressure p, the resistive element 22 (not shown) is energized by applying a current to the resistive element 22. The resistive element 22 applies heat H to the resin strip 29. Then, the resin strip 29 melts or gets sufficient molecular movability and/or reactivity to polymerize with the laminates of the half-shells 9, 10.

Figure 14:
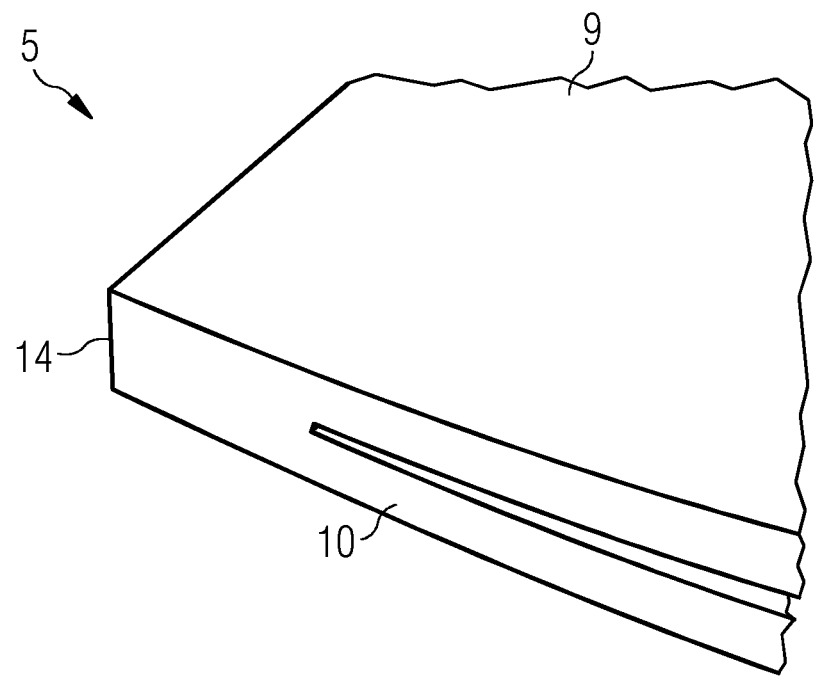
FIG. 14 shows a further perspective detail view of the rotor blade according to FIG. 2.

FIG. 14 shows a further perspective detail view of the rotor blade 5.

The heat-affected zone of the rotor blade 5 cools down and the resin binds to itself. The external pressure p is removed and the rotor blade 5 is demolded. A homogeneous and single-matrix composite remains as a result.

The resin is added in the amount and form necessary to compensate for the gap between the components like the half-shells 9, 10 and the structural element 11 once it is melted by the resistance welding process. The entire rotor blade 5 can be welded in a single operation using molds 30 with a rotating and closing system. Pressure p will be applied by means of the mold 30, systems integrated in the mold 30 and/or an external tooling.

The cycle time of the entire process will be an order of magnitude lower than standard joining processes, fully finished in seconds. There should be no additional materials added at any point and the resulting rotor blade 5 will be as recyclable as the matrix material used, which in the case of a thermoplastic resin might mean a 100% recovery of the resin.

The mechanical performance of the joint will be also improved since the gap between the components of the rotor blade 5 can become lower as there is no need to fill with a foreign paste material and the resulting laminate will be an homogeneous structure.

The ability to create a microstructurally continuous laminate in a very short cycle time might enable the modularity of blade designs, making it possible to avoid using the current full size molds totally disrupting the current design and manufacturing of blades, where cycle times are about 30 hours/blade might become well below 5 hours/blade. This also means that the transportation challenges currently faced by large size blades will be bypassed by in-field application of the afore-mentioned process.

Figure 15:
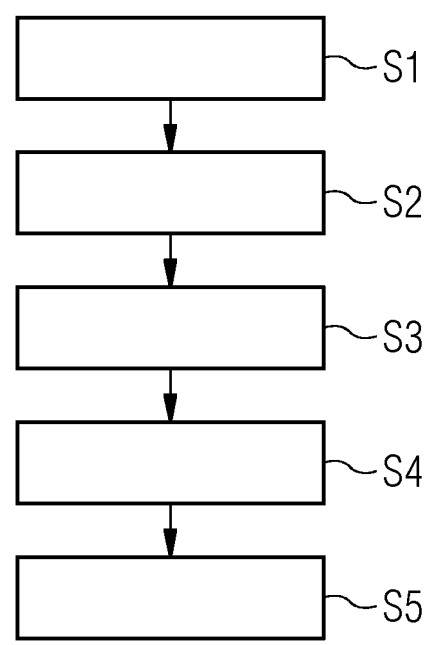
FIG. 15 shows a block diagram of one embodiment of a method for producing the rotor blade according to FIG. 2.

FIG. 15 shows a block diagram of one embodiment of a method for producing the rotor blade 5.

In step S1, at least two different components, namely the half-shells 9, 10 and/or the structural element 11 of the rotor blade 5 are provided. "Provided" in this context can include producing the components, for example by means of a lay-up process of fiber material. In the following, the half-shells 9, 10 and the structural element 11 will be named "components".

Step S2 of the method includes placing the resistive element 22 between the components 9, 10, 11. As mentioned before, the resistive element 22 can be part of at least one of the components 9, 10, 11. In a step S3 a thermoplastic or weldable thermoset resin is placed between the components 9, 10, 11. This can be done in the form of the resin strip 29 as explained earlier.

In step S4, the resistive element 22 is energized so that the resistive element 22 applies heat H to the thermoplastic or weldable thermoset resin to melt or to soften it. The resistive element 22 is energized by means of the heating apparatus 28. Step S5 includes joining the components 9, 10, 11 together by means of the molten or softened thermoplastic or weldable thermoset resin. In this way, the rotor blade 5 is formed. Also, a sub-module of the rotor blade 5 can be formed in this way. During steps S4 and S5, pressure p is applied to the components 9, 10, 11.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for producing a rotor blade of a wind turbine, the method comprising:
    providing at least two different components of the rotor blade, wherein the at least two different components comprise a first half-shell and a second half-shell;
    providing a structure between the first half-shell and the second-half shell, wherein the structure comprises a structural element, a resistive element, and a resin strip, wherein the resistive element is disposed between, and is embedded in both, the structural element and the resin strip, wherein the resin strip is in direct mechanical contact with the first half-shell, wherein the structural element comprises fiber composite material, and wherein the resistive element comprises copper or carbon fibers;
    placing a mold on, and in direct mechanical contact with, an outer surface of the first half-shell;
    simultaneously: (i) energizing the resistive element so that the resistive element applies heat to the resin strip to soften the resin strip and (ii) applying pressure to the mold in a direction toward the first half-shell; and
    after completion of said simultaneously energizing the resistive element and applying pressure to the mold, cooling the resin strip and removing the mold.

2. The method according to claim 1, wherein the resin strip is a continuous strip of thermoplastic or weldable thermoset resin.

3. The method according to claim 1, wherein the resistive element has a form of wires or a mesh.

4. The method according to claim 2, wherein the thermoplastic or weldable thermoset resin is placed between the at least two different components by creating resin-rich surface layers on at least one of the at least two different components.

5. The method according to claim 1, wherein the resistive element remains in the rotor blade.

6. The method according to claim 1, wherein the resistive element comprises resin-coated wires that are placed between the structural element and the resin strip.

\* \* \* \* \*